US012791403B2

(12) United States Patent
Krishnaswamy et al.

(10) Patent No.: US 12,791,403 B2
(45) **Date of Patent: *Nov. 10, 2026**

(54) ADAPTIVE METHOD FOR CALIBRATING MULTIPLE TEMPERATURE SENSORS ON A SINGLE SEMICONDUCTOR DIE

(71) Applicant: Oracle International Corporation, Redwood Shores, CA (US)

(72) Inventors: Venkatram Krishnaswamy, Los Altos, CA (US); Sebastian Turullols, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 756 days.

This patent is subject to a terminal disclaimer.

(21) Appl. No.: 18/328,841

(22) Filed: Jun. 5, 2023

(65) Prior Publication Data

US 2023/0314240 A1 Oct. 5, 2023

Related U.S. Application Data

(63) Continuation of application No. 16/459,464, filed on Jul. 1, 2019, now Pat. No. 11,703,400, which is a (Continued)

(51) Int. Cl.
*G01K 15/00* (2006.01)

(52) U.S. Cl.
CPC .................................. *G01K 15/005* (2013.01)

(58) Field of Classification Search
CPC .................................................... G01K 15/005
See application file for complete search history.

(56) References Cited

U.S. PATENT DOCUMENTS 6,006,169 A 12/1999 Sandhu et al.
6,985,000 B2 1/2006 Feder et al.
(Continued)

FOREIGN PATENT DOCUMENTS

TW 200643391 A 12/2006
TW 200745526 A 12/2007
(Continued)

OTHER PUBLICATIONS

Office Action in Taiwanese Appl. No. 105130914 mailed Jul. 2, 2020, 3 pages.
(Continued)

*Primary Examiner* — John E Breene
*Assistant Examiner* — Janice M Soto
(74) *Attorney, Agent, or Firm* — Kowert, Hood, Munyon, Rankin & Goetzel, P.C.; Scott W. Pape; Dean M. Munyon

(57) ABSTRACT

A system is disclosed, including an interface to a DUT and a testing apparatus. The DUT includes a first plurality of temperature sensing circuits. The testing apparatus may store a plurality of control values. Each control value may depend on at least two calibration values of corresponding temperature sensing circuits of a second plurality of temperature sensing circuits. The testing apparatus may generate a plurality of calibration values for the DUT. Each calibration value corresponds to one of the first plurality of temperature sensing circuits. The testing apparatus may determine a plurality of test values for the DUT. The testing apparatus may calculate a probability value, and repeat generation of the plurality of calibration values upon determining that the probability value is less than a predetermined threshold value. The probability value corresponds to a likelihood that the plurality of calibration values is accurate.

20 Claims, 6 Drawing Sheets

Related U.S. Application Data continuation of application No. 14/865,149, filed on Sep. 25, 2015, now Pat. No. 10,337,932.

(56) References Cited

U.S. PATENT DOCUMENTS

| | | | | |
|---|---|---|---|---|
| 7,180,380 | B2 * | 2/2007 | Bienek .................. | H10W 40/00 377/25 |
| 7,394,271 | B2 | 7/2008 | Lopez et al. | |
| 7,512,514 | B2 | 3/2009 | Duarte et al. | |
| 7,695,189 | B2 | 4/2010 | Lim et al. | |
| 8,734,006 | B2 | 5/2014 | Crafts et al. | |
| 8,757,870 | B2 | 6/2014 | Hall et al. | |
| 2013/0076381 | A1 | 3/2013 | Takayanagi et al. | |
| 2014/0140364 | A1 | 5/2014 | Charles et al. | |

FOREIGN PATENT DOCUMENTS

| | | |
|---|---|---|
| TW | 200839207 A | 10/2008 |
| TW | 201319534 | 5/2013 |
| TW | I403704 | 8/2013 |

OTHER PUBLICATIONS

Office Action in Taiwanese Appl. No. 110103749 mailed May 4, 2021, 3 pages.

* cited by examiner

ADAPTIVE METHOD FOR CALIBRATING MULTIPLE TEMPERATURE SENSORS ON A SINGLE SEMICONDUCTOR DIE

The present application is a continuation of U.S. application Ser. No. 16/459,464, filed Jul. 1, 2019, which is a continuation of U.S. application Ser. No. 14/865,149, filed Sep. 25, 2015 (now U.S. Pat. No. 10,337,932), which is incorporated by reference herein in its entirety.

BACKGROUND

Field of the Invention

The embodiments herein relate to testing of integrated circuits and, more particularly, to the calibration of temperature sensors included in integrated circuits.

Description of the Related Art

The performance of high-end integrated circuits (ICs), such as, for example, microprocessors, has increased over the years and continues to increase when looking at IC designs for the future. Generally speaking, the performance boost of microprocessors may be associated with higher clock frequencies (i.e., shorter clock periods) allowing more instructions to be executed in a given period of time and smaller manufacturing technologies that allow more complex circuits to be designed into a given area of a chip (i.e., higher density circuits), allowing for more functionality. These increases in processor frequency and circuit density, however, may include increases in power consumption and thus, may increase chip temperature and temperature variations inside the chip.

A microprocessor operating at a high temperature with temperature variations across the chip may experience various issues, such as, for example, performance degradation, leakage power increase, reduced reliability, function failures, etc. Thermal considerations, therefore, may need to be properly addressed during microprocessor chip design. One method to obtain temperature information may be to place a respective temperature sensing circuit at several locations on the chip. Calibration of each temperature sensing circuit may be performed to improve an accuracy of each circuit's temperature measurements.

SUMMARY

Various embodiments of systems and methods for calibrating a plurality of temperature sensing units are disclosed. An embodiment of a system includes an interface configured to communicate to a device under test (DUT), and a testing apparatus. The DUT may include a first plurality of temperature sensing circuits. The testing apparatus may be configured to store a plurality of control values, wherein each control value of the plurality of control values is dependent upon at least two calibration values of corresponding temperature sensing circuits included in a second plurality of temperature sensing circuits. A first subset of the second plurality of temperature sensing circuits may be located on a first device, and a second subset of the second plurality of temperature sensing circuits may be located on a second device. The testing apparatus may be further configured to generate a plurality of calibration values for the DUT, wherein each calibration value of the plurality of calibration values may correspond to a respective temperature sensing circuit of the first plurality of temperature sensing circuits. The testing apparatus may also be configured to determine a plurality of test values for the DUT, wherein each test value of the plurality of test values may correspond to one or more control values of the plurality of control values. The testing apparatus may be further configured to calculate a probability value dependent upon the plurality of test values and the plurality of control values, and to repeat generation of the plurality of calibration values in response to a determination that the probability value is less than a predetermined threshold value. The probability value may correspond to a likelihood that the plurality of calibration values is accurate.

In a further embodiment, the first device may include a set of known good calibration values and the second device may include a set of known bad calibration values. In another embodiment, to calculate the probability value, the testing apparatus may be further configured to set the probability value between zero and one, wherein a value of zero corresponds to minimal likelihood of an accurate calibration value and a value of one corresponds to a maximum likelihood of an accurate calibration value.

In an embodiment, the plurality of control values may be determined dependent upon a logistic regression probability model. In a further embodiment, the testing apparatus may be further configured to calculate the probability value using a sigmoid function.

In another embodiment, the testing apparatus may be further configured to determine each test value of the plurality of test values dependent upon two or more calibration values of the plurality of calibration values. In a further embodiment, the testing apparatus may be further configured to select the two or more calibration values dependent upon a physical proximity between their respective temperature sensing circuits of the first plurality of temperature sensing circuits.

BRIEF DESCRIPTION OF THE DRAWINGS

The following detailed description makes reference to the accompanying drawings, which are now briefly described.

Figure 1:
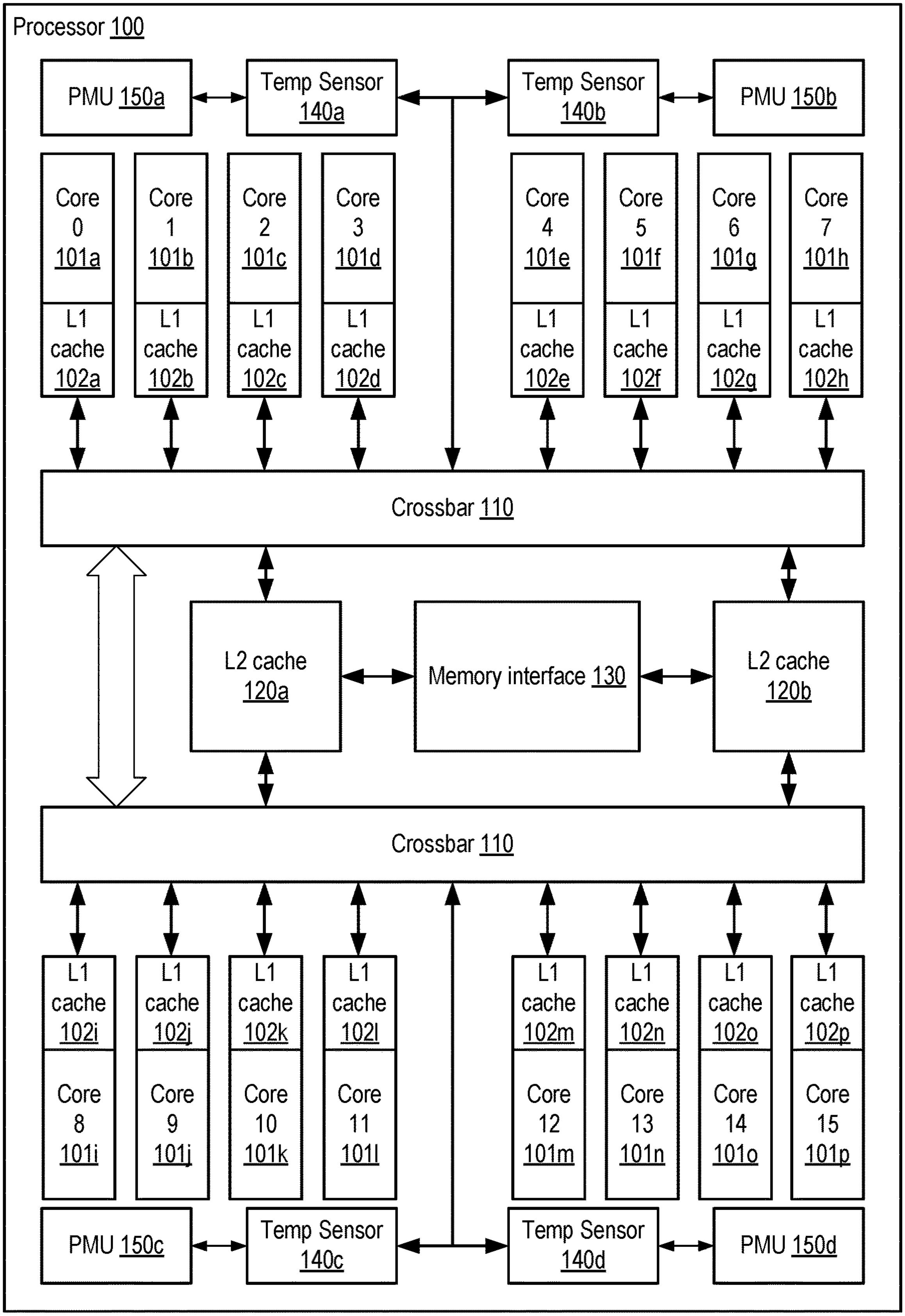
FIG. 1 is a block diagram illustrating an embodiment of a microprocessor integrated circuit (IC).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

Generally speaking, a microprocessor (also referred to herein as a "processor," a "microprocessing unit," or "MPU") may include one or more processor cores on a single integrated circuit (IC). A processor core (or simply, a "core") may refer to a unit of a microprocessor that is capable of executing program instructions and processing data independently of other processor cores within the microprocessor, such that multiple cores may execute instructions concurrently. Performance of a processing core may be impacted by a multitude of factors, including, but not limited to, microprocessor clock speed, the number of cores in the microprocessor, and speed of the memory accesses.

Another factor that may impact performance is a temperature of the microprocessor chip itself. Operating at higher clock frequencies and/or higher supply voltages, the temperature of the microprocessor chip may increase, especially in high density designs that may be used in modern chips. Temperatures within the chip, for example, at junctions of P-type and N-type silicon occurring in transistors (also referred to herein as junction temperatures) may increase beyond the ambient temperature surrounding the packaged chip. If junction temperatures rise too high, then performance of associated transistors may degrade, possibly to a point of failure for the chip. External components, such as heat sinks and fans, may be used in some embodiments to improve heat dissipation of a packaged microprocessor, thereby cooling the chip off faster and allowing the microprocessor to run at a higher performance level for a longer time. Even with these external components, a microprocessor may still generate more heat than can be dissipated in a given amount of time.

In a multi-core microprocessor, in which two, four, or even 32 or more processor cores may be included, the various cores may be operating at different performance levels, which may lead to variations of temperature across a microprocessor chip. In some cases, a portion of the cores may be operating at a higher performance level and therefore generating more heat than the remaining portion of the cores. These temperature variations across the chip may cause various issues, such as, for example, performance degradation, leakage power increase, reduced reliability, function failures, etc. To address the temperature variations, temperature sensing may be required at multiple locations throughout the microprocessor chip in order to adjust performance levels to compensate for high operating temperatures.

Temperature sensors may be calibrated in order to compensate for process variations during manufacturing that may cause a response curve of a given sensor design to vary from chip to chip. Determining a respective calibration value for each temperature sensor on a microprocessor may result in each sensor providing more accurate temperature measurements. Determining a "good" calibration value (i.e., a calibration value that results in in a temperature response curve that meets an acceptable level of accuracy) versus a "bad" calibration value (i.e., does not meet the acceptable level of accuracy) may provide a challenge in a production test environment. Typically, a temperature sensor is tested and calibrated by heating or cooling a device under test (DUT) to a known temperature, comparing an output value of the sensor to an expected value for the known temperature, and then determining a calibration value that shifts the output value closer to the expected value. Production test equipment may, however, have limited capabilities for holding a DUT to the known temperature during test. In addition, as previously stated, various areas of an IC may have different temperatures during operation, including operations associated with a production test.

Embodiments disclosed herein may provide a capability to calibrate multiple temperature sensors with an increased level of accuracy. The calibration capability may compensate for process and power supply variations, which may produce more accurate temperature sensing across an IC during microprocessor operation. A multicore processor is used in the embodiments herein as an example IC. The systems and methods disclosed, however, may be applicable to any type of IC that includes multiple temperature sensors.

In various embodiments, a multicore processor may include a number of instances of a processing core, as well as other features. One example of a 16-core processor is depicted in FIG. 1. In the illustrated embodiment, processor 100 may include sixteen instances of a core, denoted as cores 101*a-p* and also designated "core 0" though "core 15." Cores 101*a-p* may each include local L1 cache 102*a-p*. Cores 101*a-p* may be coupled to L2 caches 120*a* and 120*b* through crossbar 110. In addition, cores 101*a-p* may be coupled to memory interface 130 through L2 caches 120*a-b*. Memory interface 130 may be further coupled to L3 cache 140 as well as system memory 150. It is noted that in various embodiments, the organization of FIG. 1 may represent a logical organization rather than a physical organization, and other components may also be employed. For example, in some embodiments, cores 101*a-p* and L2 caches 120*a-b* may not connect directly to crossbar 410, but may instead interface with the crossbar through intermediate logic. L3 cache 140 and system memory may reside external to processor 100.

Cores 101*a-p* may be configured to execute instructions and to process data according to a particular Instruction Set Architecture (ISA). In one embodiment, cores 101*a-p* may be configured to implement the SPARC® V9 ISA, although in other embodiments it is contemplated that any desired ISA may be employed, such as x86, ARM®, PowerPC® or MIPS®, for example. Additionally, as described in greater detail below, in some embodiments each instance of core 101 may be configured to execute multiple threads concurrently, where each thread may include a set of instructions that may execute independently of instructions from another thread. In various embodiments it is contemplated that any suitable number of cores 101*a-p* may be included within a processor, and that cores 101*a-p* may concurrently process some number of threads.

L1 caches 102*a-p* may reside within cores 101*a-p* or may reside between cores 101*a-p* and crossbar 110. L1 caches 102*a-p* may be configured to cache instructions and data for use by their respective cores 101*a-p*. In some embodiments, each individual cache 102*a-p* may be implemented using set-associative or direct-mapped techniques. For example, in one embodiment, L1 caches 102*a-p* may be 13 kilobyte (KB) caches, where each L1 cache 102*a-p* is 2-way set associative with a 13-byte line size, although other cache sizes and geometries are possible and contemplated.

Crossbar 110 may be configured to manage data flow between cores 101*a-p* and the shared L2 caches 120*a-b*. In one embodiment, crossbar 110 may include logic (such as multiplexers or a switch fabric, for example) that allows any core 101*a-p* to access any bank of L2 cache 120*a-b*, and that conversely allows data to be returned from any bank of L2 cache 120*a-b* to any core 101*a-p*. Crossbar 110 may be configured to concurrently process data requests from cores 101*a-p* to L2 cache 120*a-b* as well as data responses from L2 cache 120*a-b* to cores 101*a-p*. In some embodiments, crossbar 110 may include logic to queue data requests and/or responses, such that requests and responses may not block other activity while waiting for service. It is noted that in various embodiments, crossbars 110 may be implemented using any suitable type of interconnect network, which, in some embodiments, may correspond to a physical crossbar interconnect.

L2 caches 120*a-b* may be configured to cache instructions and data for use by cores 101*a-p*. L2 cache 120*a* may be coupled to cores 101*a-h* and L2 cache 120*b* may similarly be coupled to cores 101*i-p*. As the number of cores 101 is increased, the size and/or number of L2 caches 120 may also be increased in order to accommodate the additional cores 101. For example, in an embodiment including 16 cores, L2 cache 120 may be configured as 2 caches of 3 MB each, with each cache including 8 individual cache banks of 384 KB, where each bank may be 24-way set associative with 256 sets and a 13-byte line size, although any other suitable cache size or geometry may also be employed.

Memory interface 130 may be configured to manage the transfer of data between L2 caches 120*a-b* or external system memory in response to L2 fill requests and data evictions, for example. In some embodiments, multiple instances of memory interface 130 may be implemented, with each instance configured to control a respective bank of external system memory. Memory interface 130 may be configured to interface to any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of memory.

Cores 101*a-p* may be organized into groups, with the cores of each group physically co-located to share resources such as locally distributed power supply signals and clock signals. In the illustrated embodiment, cores 101*a-p* may be segmented into groups of four such that each group of cores may occupy roughly one quadrant of a microprocessor chip. Each quadrant may include one or more temperature sensing units 140*a-d*. Temperature sensing units 140*a-d* may monitor a junction temperature in their respective quadrant. Monitoring may be continuous, periodic, or in response to a control signal asserted by a given core of cores 101*a-p*. Details of embodiments of temperature sensing units will be provided below.

In addition to temperature sensing units 140*a-d*, a given one of power management units (PMU) 150*a-d* may be located in each quadrant. Power control circuits 150*a-d* may control local distribution of power supply signals and clock signals within each quadrant. Power control circuits 150*a-d* may control voltage levels of one or more power supply signals and may control frequencies of one or more clock signals to the cores 101 in a respective quadrant. Voltage levels may be adjusted by use of voltage regulating circuits or by selecting from multiple power supply signals through switches or multiplexors. Similarly, clock signal frequencies may be adjusted through use of local clock divider circuits or by selecting from multiple clock signals through switches or multiplexors. In some embodiments, power control circuits may receive commands to adjust voltage levels or clock frequencies from other components in processor 100, such as from one of cores 101*a-p* or from a corresponding temperature sensing unit 140*a-d*. In other embodiments, power control circuits 150*a-d* may receive a temperature value from a corresponding temperature sensing unit 140*a-d* and determine if adjustments are necessary.

It is noted that FIG. 1 is merely an example of a multicore processor. In other embodiments, processor 100 may include network and/or peripheral interfaces. The physical structure may not be represented by FIG. 1 as many other physical arrangements may be possible and are contemplated.

Figure 2:
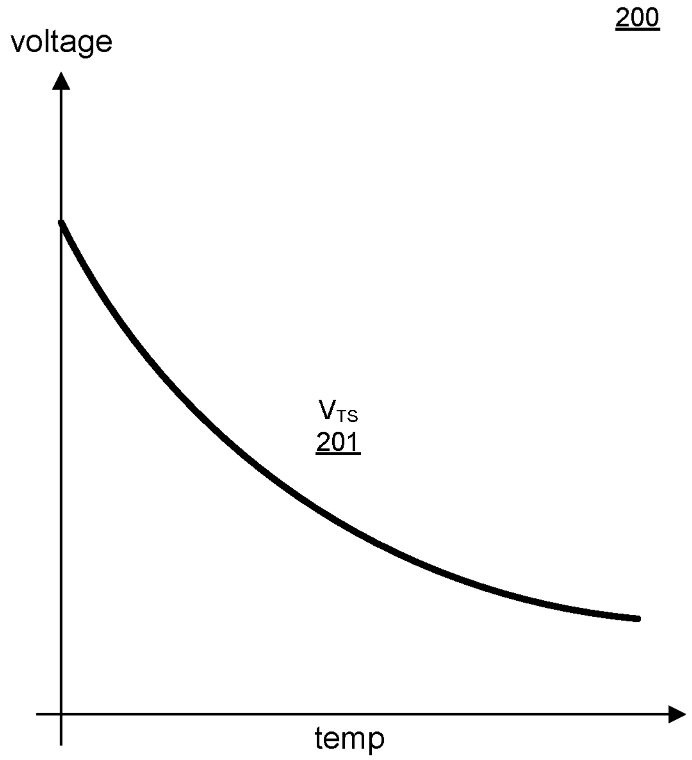
FIG. 2 is a chart illustrating a possible relationship between temperature and a voltage level output of an embodiment of a temperature sensing unit.

Moving to FIG. 2, chart 200 illustrates a relationship between temperature and voltage in an embodiment of a temperature sensing unit, such as, for example, one of temperature sensing units 140*a-d*. Waveform $V_{TS}$ 201 may correspond to a voltage level of a temperature sensitive circuit within a temperature sensing unit.

The voltage level of $V_{TS}$ 201 is shown to fall as temperature rises. In other embodiments, the voltage level of $V_{TS}$ 201 may rise along with temperature. In various embodiments, $V_{TS}$ 201 may or may not change linearly with respect to changes in temperature. $V_{TS}$ 201 may, in some embodiments, be sensitive to changes in a voltage level of a power supply coupled to the chip. Waveform $V_{TS}$ 201, therefore, may be assumed to occur at a given operational voltage level. $V_{TS}$ 201 may, in some embodiments, scale proportionately with changes in the voltage level. The circuit for generating $V_{TS}$ 201 may be implemented with any suitable circuit design. For example, the circuit design may include diodes created with respective bipolar junction transistors (BJTs) using a design known to be sensitive to temperature changes.

It is noted that the waveform of FIG. 2 is a simplified example for demonstrating the disclosed concepts. Actual waveforms may vary due to various influences such operating conditions, manufacturing technology used and processing variations during fabrication.

Figure 3:
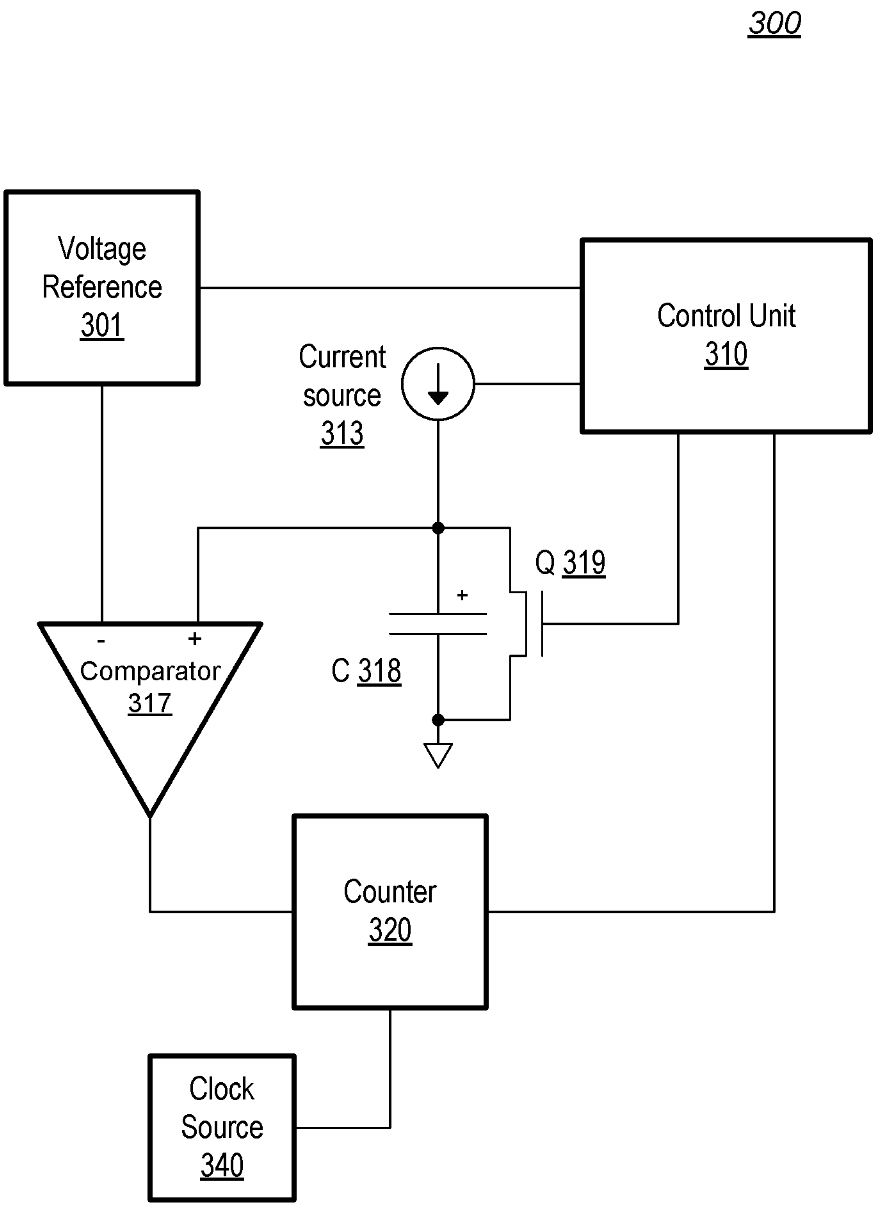
FIG. 3 is a block diagram illustrating an embodiment of a temperature sensing unit.

Turning now to FIG. 3, a block diagram illustrating an embodiment of a temperature sensing unit is presented. Temperature sensing unit 300 may correspond to one instance of temperature sensing units 140*a-d*. Temperature sensing unit 300 includes voltage reference 301 coupled to an input of comparator 317. Comparator 317 is further coupled to capacitor (C) 318 and counter 320. Temperature sensing unit 300 also includes control unit 310, coupled to current source 313, counter 320, and transistor (Q) 319. Clock source 340 is coupled to counter 320.

Voltage reference 301 provides an output voltage that may correspond to waveform $V_{TS}$ 201 in FIG. 2. Voltage generator 301 may correspond to a power supply coupled to a temperature sensitive diode, a bandgap voltage reference, or any other suitable circuit with a predictable temperature profile. When enabled, voltage reference 301 outputs a signal with a voltage level that corresponds to a temperature of at least a portion of the circuit, such as, for example, a temperature sensitive diode.

Comparator 317 outputs a digital signal with a value depending on which of two analog input signals has a higher voltage level. The output signal of voltage reference 301 is coupled to an input of comparator 317. The other analog input is coupled to capacitor 318. Capacitor 318 is discharged when transistor 319 is turned on and current source 313 is off. When this arrangement is swapped with current source 313 turned on and transistor 319 turned off, a voltage level across capacitor 318 begins to increase. The constant current output of current source 313 causes a voltage ramp to rise on the second analog input of comparator 317.

While the voltage is ramping up on the second analog input of comparator 317, a count value in counter 320 increments. Counter 320 increments the count value dependent upon transitions of a clock signal from clock source 340. In various embodiments, counter 320 may increment the count value in response to each rising transition, falling transition, or any transition of the clock signal. In some embodiments, the count value may increment once in response to multiple transitions. In other embodiments, counter 320 may decrement the count value from an initial value rather than increment the count value.

When the voltage level on the second input of comparator 317 is equal to or greater than the voltage level from voltage reference 301 on the other input to comparator 317, then the output of comparator 317 transitions. The output of comparator 317 is coupled to an input of counter 320, such that this transition disables further increments of the count value.

In the present embodiment, control unit 310 manages the interaction of various components of temperature sensing unit 300. Control unit 310 is coupled to current source 313 to enable or disable an output of current source 313, and is also coupled to a control gate of transistor 319 to turn it on and off. Control unit 310 also enables, disables, and resets counter 320. For example, control 310 may reset counter 320 while current source 313 is disabled and then enable counter 320 at a similar time when current source 313 is turned on. When enabled, counter 320 increments the count value dependent upon the clock signal received from clock source 340. By enabling both current source 313 and counter 320 at approximately the same time, counter 320 may increment while the voltage ramp on capacitor 318 is less than voltage reference 301 and then stop incrementing responsive to the transition of comparator 317 when the voltage level of the voltage ramp reaches the voltage level of voltage reference 301. Counter 320 sends the count value to control unit 310, which may use the count value to determine a temperature value corresponding to the temperature at the location of the voltage reference 301.

It is noted that FIG. 3 is merely an example of a temperature sensing unit. In other embodiments, temperature sensing unit 300 may include other components or components may be coupled differently. The physical structure may not be represented by FIG. 3 as many other physical arrangements may be possible and are contemplated.

Figure 4:
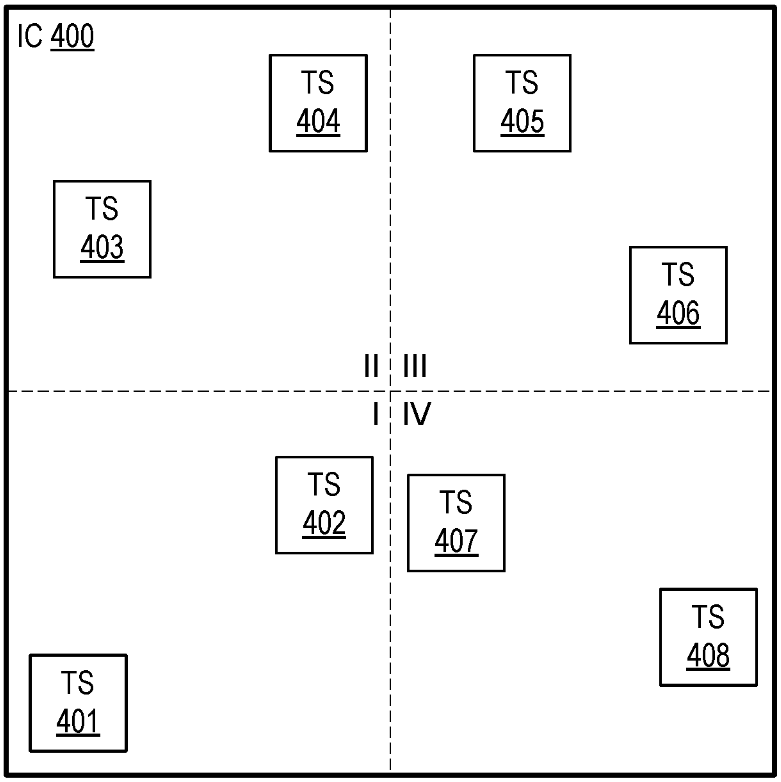
FIG. 4 is an illustration of an IC indicating locations of eight temperature sensing units.

Moving now to FIG. 4, a diagram of an IC indicating locations of multiple temperature sensing units is shown. IC 400 may correspond to a processor, a system on a chip, an application specific IC, or any other type of semiconductor chip capable of supporting multiple temperature sensing circuits. IC 400 includes eight temperature sensing circuits, labeled TS 401 through TS 408, and located at various physical locations on IC 400.

The illustration of IC 400 includes dotted lines, dividing IC 400 into four quadrants, labeled I through IV. In the present embodiment, each quadrant includes two respective circuits of TS 401-408 and their placement is not symmetrical across vertical or horizontal axes. In other embodiments, however, any number of temperature sensing circuits may be placed in each quadrant, including a different number of circuits per quadrant, and the relative location of each circuit may or may not be symmetric with other temperature sensing circuits.

Referring back to FIG. 2, a given temperature sensing circuit has a corresponding voltage output vs ambient temperature as demonstrated by waveform $V_{TS}$ 201. This relationship between voltage and temperature is referred to herein as a "temperature profile" of a temperature sensing circuit. The characteristics of waveform $V_{TS}$ 201 may be altered by the given temperature sensing circuit's location on IC 400. Accordingly, even if a same circuit design is used, each circuit of TS 401-408 may have a different corresponding voltage output vs temperature profile.

Figure 5:
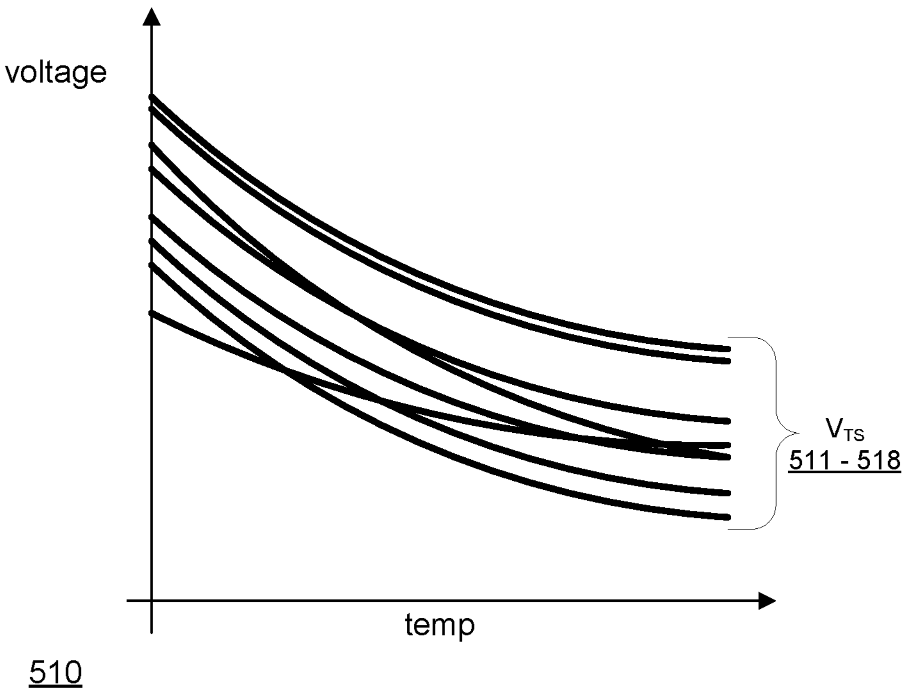
FIG. 5 is a chart showing possible temperature versus voltage level outputs for each embodiment of the eight temperature sensing units in FIG. 4.

Waveforms corresponding to each of TS 401-408 are shown in FIG. 5. Similar to FIG. 2, FIG. 5 illustrates the relationship between ambient temperature and voltage for each temperature sensing circuit TS 401-408. It is noted that each temperature profile is different, no two waveforms are identical. In some instances, two or more waveforms may have a similar shape with a similar voltage offset at each temperature. In other instances, some waveforms may have a different slope than the other waveforms at a given temperature. Calibrating the temperature sensing circuits may attempt to make temperature profiles more uniform. After calibration, however, some temperature sensing circuits may still have different temperature profiles due to location on the die, power supply variations, influence from adjacent circuits, etc.

During operation, two temperature sensing circuits, such as, for example, TS 403 and TS 408, might have calibrated temperature profiles that are similar. If circuits near TS 403 are very active while circuits near TS 408 are idle, then TS 403 may produce an output voltage indicating a higher temperature than TS 408 for a given ambient IC temperature. The active circuits near TS 403 may generate heat that has more impact on nearby TS 403 than on TS 408 on the other side of the IC.

By understanding the similarities and differences between each of TS 401-408 on IC 400, a testing methodology may be utilized that assesses a quality level of calibrations made to each of TS 401-408. Generally speaking, IC testing includes executing a same suite of test procedures on each DUT, with each test procedure being executed in a same order. If the order of test procedures is consistent from DUT to DUT, then during testing of each DUT, known circuits may be tested before calibration of TS 401-408. Heat generated by previously tested circuits may be predictable, and, therefore, impact of the generated heat may be estimated for TS 401-408 based on each temperature sensing circuit's location relative to the tested circuits.

For example, if a processor core located in quadrant II of IC 400 is tested prior to calibration of TS 401-408, then TS 403 and TS 404 may be estimated to be at a higher temperature than the ambient temperature of IC 400 and higher than the other temperature sensing circuits. TS 402, TS 405 and TS 407 may be estimated to be at a temperature lower than the circuits of quadrant II, yet higher than the ambient temperature. TS 401, TS 406 and TS 408 may be estimated to be close to the ambient temperature.

Continuing the example, after an initial calibration of TS 401-408 has completed, resulting calibration values for each of TS 401-408 are compared to each other and to expected results. The expected results may include expected results for known good (e.g., accurate) temperature sensor calibrations as well expected results for a known bad (e.g., inaccurate) calibrations. Statistical analysis of the measured results versus the good and bad expected results allows for a determination if the calibrations of TS 401-408 are acceptable or not. If acceptable calibrations are determined, then test procedures for other circuits may be performed, if necessary. If a determination is made that one or more of the calibration values is unacceptable, then one or more of TS 401-408 may be re-calibrated and the calibration values re-assessed for accuracy. After a predetermined number of unacceptable calibrations, the DUT may be rejected as a failed device.

Figure 6:
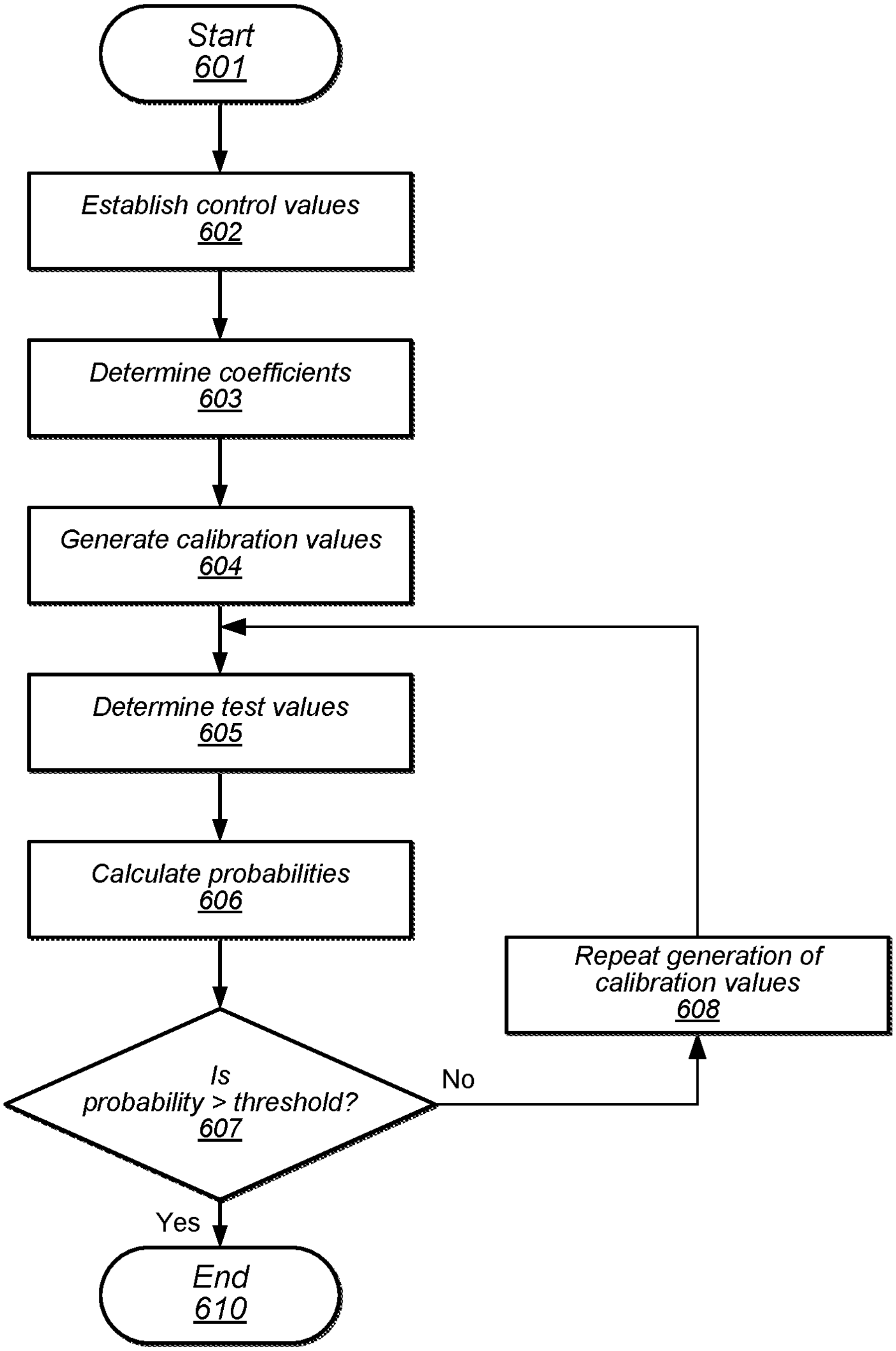
FIG. 6 illustrates a flow chart depicting an embodiment of a method for calibrating multiple temperature sensing units on a single IC.

It is noted that FIG. 5 and FIG. 6 are merely examples of placement of temperature sensing units and their corresponding temperature profile. In other embodiments, characteristics of waveforms $V_{TS}$ 511-518 may be different. Other physical arrangements of temperature sensing circuits on an IC are possible and contemplated.

Turning to FIG. 6, an embodiment of a method is illustrated for calibrating multiple temperature sensing units on a single IC. The method of FIG. 6 may be applicable to a temperature sensing unit such as temperature sensing unit 300 of FIG. 3 as well as to a processor such as processor 100 in FIG. 1. The method of FIG. 6 may be utilized in a manufacturing test process. Referring collectively to processor 100, temperature sensing unit 300 and the flowchart of FIG. 6, the method may begin in block 601.

Control values are determined during a calibration test development process (block 602). Before a calibration test for processor 100 is used in a manufacturing test process, data is gathered from at least one example of processor 100 with known good temperature sensing unit calibration values and at least one example of processor 100 with known bad calibration values. As used herein, a "good" calibration value refers to a calibration value that results in temperature measurements by a respective temperature sensing unit that are within an acceptable range of the actual temperature. Likewise, a "bad" calibration value, as used herein, refers to a calibration value that results in temperature measurements by a respective temperature sensing unit that are outside of the acceptable range of the actual temperature.

In some embodiments, the control values may correspond to the good and bad calibration values, themselves. In the present embodiment, control values are determined based on of the good and bad calibration values. Each control value corresponds to one of a variety of statistical calculations using calibrations from two or more temperature sensing units on a given processor 100. The control values may include mean values and/or standard deviations of calibration values from various combinations of two or more temperature sensing units 140 on a same processor 100. For example, the control values may include mean values of calibration values from temperature sensing units 140*a* and 140*b*, from temperature sensing units 140*c* and 140*d*, from temperature sensing units 140*a* and 140*c*, and from temperature sensing units 140*b* and 140*d*. Other control values may include a standard deviation of all temperature sensing units 140 on a given processor 100. Any suitable combination of statistical values based on the calibration values of temperature sensing units 140 may be used. Corresponding control values may be generated for both the processor 100 with known good calibration values and the processor 100 with known bad calibration values, thereby generating a set of known good control values and a set of known bad control values.

Continuing the test development, the known good control values and the known bad control values are used to determine coefficients for a test equation (block 603). The test equation, in the current embodiment, will be used during a test process to determine if the temperature sensors of a device under tests (DUT) have been adequately calibrated. In at least one embodiment, a logistic regression process is used to develop a probability model for the temperature sensing units 140 on a processor 100. The known good and known bad control values are used in the logistic regression process to develop the model and determine the coefficients for the test equation.

During the test process, calibration values are generated for temperature sensing units of a DUT (block 604). A respective calibration value is determined for each temp sensing unit 140 on a processor 100 that is under test. In various embodiments, each calibration value may be determined by either measuring a temperature at a test interface coupled to the processor 100 under test or by forcing a temperature at the test interface. In the present embodiment, each temperature sensing unit 140 is repeatedly measured and respective calibration values are adjusted between measurements until the measured values correspond to an expected value corresponding to the temperature at the test interface.

Using the adjusted calibration values, test values are determined for the DUT (block 604). In the current embodiment, test values for the processor 100 under test are calculated dependent upon the calibration values generated in block 603. Each test value corresponds to respective control values determined during the test development, such that each test value has at least one corresponding control value from the known good control values and at least one corresponding control value from the known bad control values. For example, similar to the control values described above, test values may include mean values of calibration values from temperature sensing units 140*a* and 140*b*, from temperature sensing units 140*c* and 140*d*, from temperature sensing units 140*a* and 140*c*, and from temperature sensing units 140*b* and 140*d*.

A probability value corresponding to a likelihood that the temperature sensing units in the DUT include accurate calibration values is determined (block 606). The test values for the DUT are placed in the test equation derived during the test development and the equation is evaluated to produce the probability value. The probability value may range from 0 to 1, with 0 corresponding to minimal likelihood that the calibration values are accurate and 1 corresponding to maximum likelihood of accurate calibration values. The probability value may be determined using a sigmoid function, such as represented by equation 1.

$$P = \frac{1}{1 + e^{-Z}} \tag{1}$$

The probability value 'P' is dependent upon the value of exponent 'Z'. 'Z' is determined as a summation of individual products of each coefficient and the corresponding test value, as shown by equation 2.

$$Z = \sum_{i=0}^{i=N} C[i] * TV[i] \tag{2}$$

Variables in equation 2 include the number of test values (N), each of the coefficients (C[i]), and each of the corresponding test values (TV[i]). The result 'Z' is placed into equation 1 resulting in a probability value between 0 and 1.

Further operation of the method is dependent upon the probability value (block 607). The probability value is compared to a threshold value established during the test development. The threshold value is selected such that a processor 100 with a probability value greater than the threshold value has calibrated temperature sensing units 140 that meet or exceed an acceptable level of accuracy when measuring a temperature. If the probability value is greater than the threshold value, then the method ends in block 610. Otherwise, the method moves to block 608 to repeat the calibration process.

If the probability value does not exceed the threshold value, the calibration values are regenerated for temperature sensing units of the DUT (block 608). In the present embodiment, the probability value corresponds to a likelihood of all temperature sensing units 140 being accurately calibrated. Accordingly, if the probability value does not exceed the threshold value, then the calibration values for each of temperature sensing units 140 are re-generated and a new probability value is calculated. In some embodiments, the calibration values may not be re-generated and the DUT is instead rejected as a failed unit. In other embodiments, a number of times the probability value does not exceed the threshold value may be tracked and re-generation of the calibration values may be limited to a predetermined number of times. After regenerating the calibration values, the method returns to block 605 to determine new test values.

The method of FIG. 6 is merely an example. Although the operations illustrated in method in FIG. 6 are depicted as being performed in a sequential fashion, in other embodiments, some or all of the operations may be performed in parallel or in a different sequence. The illustrated method refers to the probability value exceeding the threshold value to be accepted. In other embodiments, the probability value may have to meet or exceed the threshold value to be accepted.

Figure 7:
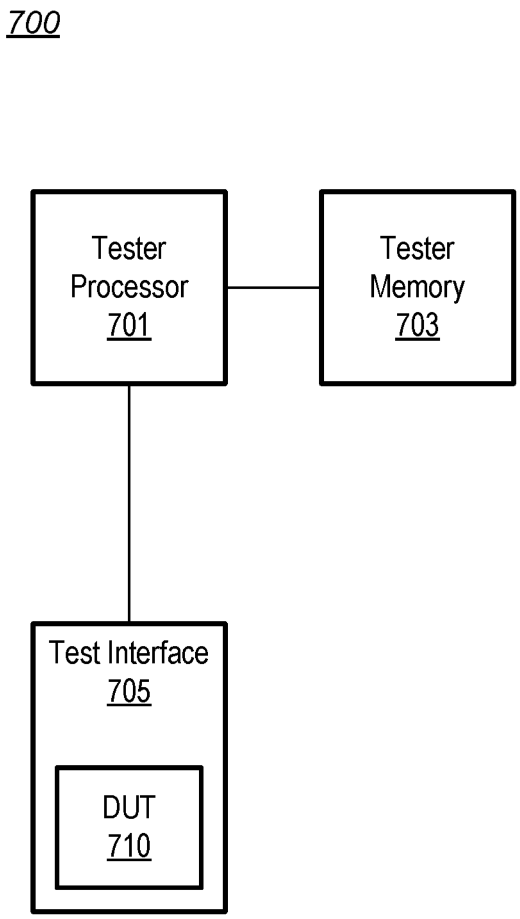
FIG. 7 shows a block diagram an embodiment of an IC testing system.

Moving to FIG. 7, a block diagram of an embodiment of an IC testing system is illustrated. IC tester 700 includes tester processor 701 coupled to tester memory 703, and to test interface 705. A device under test (DUT) 710 is coupled to test interface 705. IC tester 700 may implement a testing method, such as, for example, the method of FIG. 6.

Tester processor 701 executes and controls a test process for determining if DUT 710 is an acceptable device to sell or use in a larger product, or if DUT 710 should be rejected and discarded. Tester processor 701 may correspond to a general purpose processor, an application specific integrated circuit (ASIC), a programmable logic array (PLA), or any suitable device capable of executing instructions of a test program. In the illustrated embodiment, tester processor 701 executes a test program stored in tester memory 703.

Tester memory 703 stores one or more test programs and associated test patters for generating input stimuli and expected output values. Tester memory 703 may include a non-transitory, computer accessible storage medium for storing instructions of a test program. In some embodiments, tester memory may include a combination of volatile and non-volatile memory for storing test programs and test patterns. In other embodiments, tester memory may include just volatile memory and test programs and vectors are copied into test memory 703 before DUT 710 is tested. In addition to the test program and test vectors, other data associated with testing DUT 710 is stored in test memory 703, including values and measurements from DUT 710, such as, for example, calibration values for temperature sensing units.

In the present embodiment, test interface 705 provides an electrical connection to the pins or terminals of DUT 710. Test interface 705 includes any suitable number of relays, power supplies, clock sources, analog and/or digital signal generators, and analog and/or digital comparators. Execution of commands in the test program causes tester processor 701 to send commands to test interface 705 resulting in appropriate stimuli to be applied to DUT 710 and enabling monitoring of outputs from DUT 710 resulting from the stimuli. Comparison of the outputs to expected outputs indicated by test patterns may determine if a given DUT 710 passes or fails the test program.

Test interface 705, in the current embodiment, includes temperature controls allowing DUT 710 to be placed at a known ambient temperature. In some embodiments, precise control of the ambient temperature may not be accurate enough for calibrating temperature sensing units in DUT 710. In such embodiments, a method, such as the method of FIG. 6, may be used to improve temperature calibration results.

It is noted that IC tester 700 of FIG. 7 is merely an example. In various embodiments, an IC testing system may have more components than illustrated. For example, embodiments of IC tester 700 may additionally include displays and user input devices such as keyboards and mice, used to select a test program for a given type of DUT 710.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:

an interface configured to communicate with a device under test (DUT), wherein the DUT includes a first temperature sensing circuit; and a testing apparatus configured to:

store one or more control values that are based on one or more test calibration values from one or more temperature sensing circuits included in respective control devices, different from the DUT;

generate a calibration value for the temperature sensing circuit;

generate a probability value based on the calibration value and the one or more control values, wherein the probability value corresponds to a likelihood that the calibration value satisfies a particular level of accuracy;

in response to a determination that the probability value fails to satisfy a threshold probability value, regenerate the calibration value; and in response to a determination that the probability value satisfies the threshold probability value, calibrate, using the calibration value, the first temperature sensing circuit.

2. The system of claim 1, wherein the one or more control values includes:

at least one known good control value included in a known good device of the respective control devices; and at least one known bad control value included in a known bad device of the respective control devices.

3. The system of claim 1, wherein the testing apparatus is configured to:

use the one or more control values to determine a test equation; and generate the probability value using the test equation and the calibration value.

4. The system of claim 1, wherein to calculate the probability value, the testing apparatus is configured to determine a test value that is based on the calibration value.

5. The system of claim 4, wherein to calculate the probability value, the testing apparatus is further configured to compare the test value to at least one of the one or more of control values.

6. The system of claim 1, wherein the testing apparatus is further configured to, in response to the determination that the probability value fails to reach the threshold probability value:

regenerate the probability value using the regenerated calibration value; and increment a count value.

7. The system of claim 6, wherein the testing apparatus is further configured to reject the DUT in response to a determination that the count value reaches a threshold count value.

8. A method comprising:

establishing, by a testing apparatus, a plurality of control values based a plurality of test calibration values for a first plurality of temperature sensing circuits included in respective ones of a plurality of control devices;

generating, by the testing apparatus, a calibration value for a particular temperature sensing circuit that is included on a device under test (DUT);

generating, by the testing apparatus, a probability value based on the calibration value and the plurality of control values, wherein the probability value corresponds to a likelihood that the calibration value is accurate based on a threshold probability value; and in response to determining that the probability value satisfies the threshold probability value, calibrating, by the testing apparatus utilizing the calibration value, the particular temperature sensing circuit.

9. The method of claim 8, wherein a first control device of the plurality of control devices includes a plurality of known good calibration values and a second control device of the plurality of control devices includes a plurality of known bad calibration values.

10. The method of claim 9, further comprising generating the probability value using at least one of the plurality of known good calibration values and at least one of the plurality of known bad calibration values.

11. The method of claim 8, further comprising:

generating, by the testing apparatus for a different temperature sensing circuit on a different DUT, a different probability value that is based on a different calibration value; and in response to determining that the different probability value fails to reach the threshold probability value:

regenerating the different calibration value;

regenerating the different probability value using the regenerated different calibration value; and incrementing a count value.

12. The method of claim 11, further comprising rejecting the different DUT in response to determining that the count value reaches a threshold count value.

13. The method of claim 8, further comprising:

using the plurality of control values to determine a test equation; and generating the probability value using the test equation, and the calibration value.

14. The method of claim 13, wherein the test equation is a sigmoid function.

15. A non-transitory, computer-accessible storage medium having program instructions stored therein that, in response to execution by a computer system, causes the computer system to perform operations comprising:

storing a plurality of control values that are based on a plurality of test calibration values for a plurality of temperature sensing circuits included in respective ones of a plurality of control devices;

generating a calibration value for a particular temperature sensing circuit on a device under test (DUT);

calculating a probability value based on the calibration value and the plurality of control values, wherein the probability value corresponds to a likelihood that the calibration value satisfies a particular level of accuracy;

regenerating the calibration value in response to determining that the probability value fails to satisfy a threshold probability value; and in response to determining that the probability value satisfies the threshold probability value, calibrating, using the calibration value, the particular temperature sensing circuit included in the DUT.

16. The non-transitory, computer-accessible storage medium of claim 15, wherein a first control device of the plurality of control devices includes a plurality of known good calibration values and a second control device of the plurality of control devices includes a plurality of known bad calibration values.

17. The non-transitory, computer-accessible storage medium of claim 15, wherein the plurality of control values are determined based on a logistic regression probability model.

18. The non-transitory, computer-accessible storage medium of claim 15, wherein the operations further comprise calculating the probability value based on a sigmoid function.

19. The non-transitory, computer-accessible storage medium of claim 15, wherein the operations further comprise, in response to determining that the probability value fails to reach the threshold probability value:

regenerating the probability value using the regenerated calibration value; and incrementing a count value.

20. The non-transitory, computer-accessible storage medium of claim 19, wherein the operations further comprise rejecting the DUT in response to determining that the count value reaches a threshold count value.

* * * * *